United States Patent
Suzuki et al.

(12)
(10) Patent No.: US 6,290,380 B1
(45) Date of Patent: Sep. 18, 2001

(54) VEHICLE LAMP UNIT

(75) Inventors: Takahiko Suzuki; Hiroshi Watanabe, both of Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/259,689

(22) Filed: Mar. 1, 1999

(30) Foreign Application Priority Data

Mar. 3, 1998 (JP) .................................................. 10-050431

(51) Int. Cl.[7] .................................................. F21V 21/00
(52) U.S. Cl. .................. 362/543; 362/241; 362/247; 362/267
(58) Field of Search ..................................... 362/543, 544, 362/549, 519, 249, 240, 278, 267, 241, 247, 341; 439/57, 547, 56, 699.2

(56) References Cited

U.S. PATENT DOCUMENTS

| | | | |
|---|---|---|---|
| 4,569,006 | * | 2/1986 | Bergin et al. .......................... 362/269 |
| 5,519,588 | * | 5/1996 | Sobeck et al. ......................... 362/241 |
| 5,529,535 | * | 6/1996 | Forish .................................... 362/61 |

* cited by examiner

*Primary Examiner*—Y. Quach
(74) *Attorney, Agent, or Firm*—Armstrong, Westerman, Hattori, McLeland & Naughton, LLP (57) ABSTRACT

A vehicle lamp unit is provided. The vehicle lamp unit comprises a plurality of bulb sockets each provided with a bulb, and a frame having bulb attachment holes for accommodating the respective bulb sockets. A reflection surface is formed on a surface to be the inner surface of the frame. The bulbs are connected to the reflection surface via the respective bulb sockets, and a flat arranging material as a lighting conductor communicating with electric conductors of the vehicle is disposed on or buried under the reflection surface.

12 Claims, 7 Drawing Sheets

PRIOR ART

FIG. 12

PRIOR ART

VEHICLE LAMP UNIT

BACKGROUND OF THE INVENTION

1. Field of the Invention

The present invention relates to a vehicle lamp unit, and more specifically, to a vehicle lamp unit having a lighting conductor for bulb sockets disposed on or buried under a reflection surface formed on a frame.

2. Description of the Related Art

Figure 11:
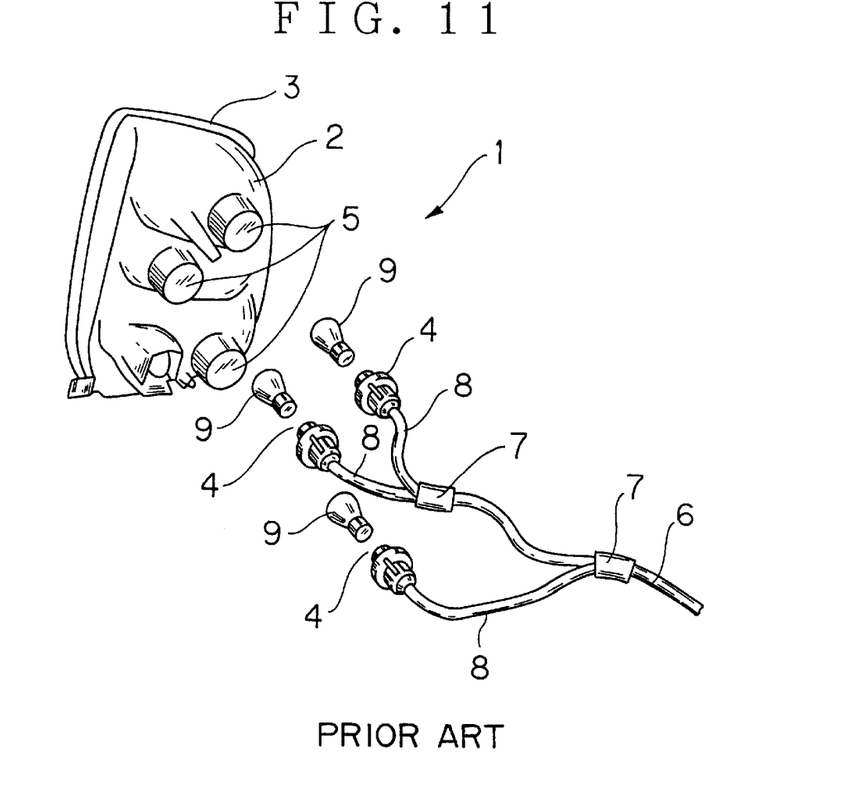
FIG. 11 is an external perspective view of a vehicle lamp unit of the prior art.

In FIG. 11, a vehicle lamp unit 1 comprises a frame 2, a lens 3 attached to the front surface of the frame 2, and a plurality of bulb sockets 4 (three bulb sockets are shown in FIG. 11) attached to the rear surface of the frame 2.

Bulb attachment holes 5 for accommodating the bulb sockets 4 are formed on the frame 2, and a reflection surface is formed on the surface to be the inner surface of the frame 2.

Figure 12:
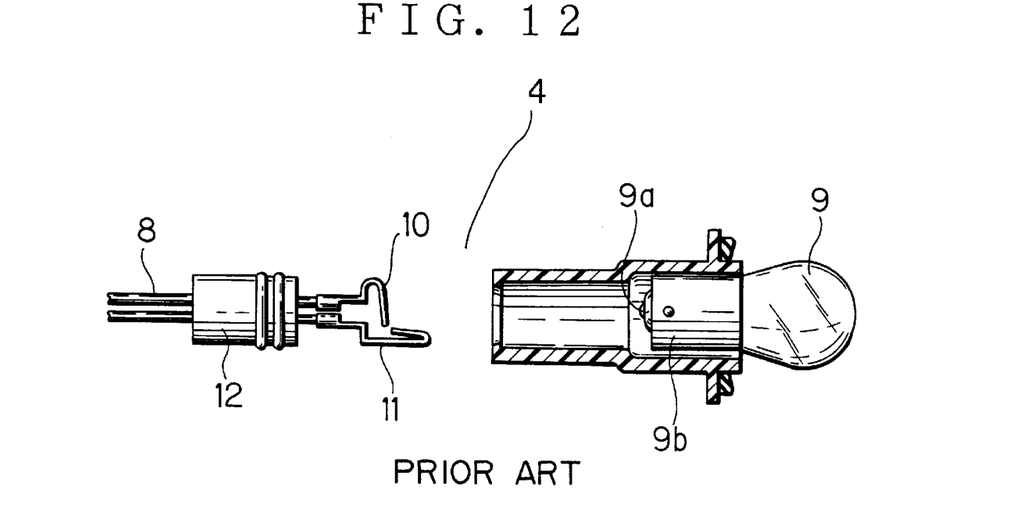
FIG. 12 is an exploded view of the bulb socket of FIG. 11.

Branch lines 8 branched from joint portions 7 of a wire harness 6 are connected to the respective bulb sockets 4, and as shown in FIG. 12, terminals 10 and 11 provided to each edge of the branch lines 8 are in contact with electrodes 9a and 9b of a bulb 9 attached to each of the bulb sockets 4. Reference numeral 12 indicates a rubber stopper for waterproofing and securing each branch line.

In the prior art, the branch lines 8 arranged on the rear surface of the frame 2 become hindrance to the exchange of the bulbs 9, resulting in poor workability in maintenance.

Also, there has been a problem that water enters from the joint portions 7 provided to the wire harness 6.

SUMMARY OF THE INVENTION

The object of the present invention is to provide a vehicle lamp unit having improved waterproof ability and reliability, and excellent workability in terms of maintenance.

The vehicle lamp unit in accordance with a first aspect of the present invention comprises: a plurality of bulb sockets each provided with a bulb; a frame having bulb attachment holes for accommodating the plurality of bulb sockets; a reflection surface formed on a surface to be an inner surface of the frame; and a lighting conductor connected to the bulbs via the respective bulb sockets and communicating with an electrical conductor of the vehicle, the lighting conductor being disposed on or buried under the reflection surface.

In the above structure, the joint portion for each of the bulb sockets provided to the lighting conductor in the same manner as in the prior art is disposed on or buried under the reflection surface formed on the frame, so that water entrance can be prevented in the joint portion and high reliability can be obtained. Also, in this structure, the lighting conductor is not arranged on the surface to be the outer surface of the frame. Thus, workability in exchanging bulbs can be made easier, and the lamp unit can be maintained in a better condition. This structure can also be applied to other types of lamp unit.

In accordance with a second aspect of the vehicle lamp unit of the present invention, the lighting conductor is formed from a belt-like flat arranging material, and a reflection surface corresponding to the reflection surface formed on the frame is formed on at least one side surface of the flat arranging material.

By employing the above flat arranging material as the lighting conductor, workability in arrangement can be improved. Also, the reflection surface corresponding to the reflection surface formed on the frame can prevent defects in the function of the lamp unit.

In accordance with a third aspect of the present invention, the flat arranging material is arranged by caving the reflection surface formed on the frame by the thickness of the flat arranging material.

By employing the flat arranging material, the reflection surface formed on the frame and the reflection surface of the flat arranging material can be made one surface.

In accordance with a fourth aspect of the vehicle lamp unit of the present invention, the lighting conductor is made of wires which are enameled wires or metal wires; a concave groove for accommodating wires are formed by caving the reflection surface formed on the frame; a cover for the concave groove is attached to the reflection surface formed on the frame; and a reflection surface corresponding to the reflection surface formed on the frame is formed on at least one side surface of the cover.

By forming the lighting conductor from the wires and forming the concave groove on the reflection surface formed on the frame, the wires can be easily arranged. Also, the reflection surface corresponding to the reflection surface formed on the frame can prevent defects in the function of the lamp unit.

In accordance with a fifth aspect of the vehicle lamp unit of the present invention, clips or fixing grooves are formed in the concave groove.

By forming the clips or the fixing grooves in the concave groove, high stability can be obtained in arrangement so as not to displace the wires. Also, the clips or the fixing grooves can be formed at the same time as forming the frame, so that the number of components can be restricted.

In accordance with a sixth aspect of the vehicle lamp unit of the present invention, each of the bulb sockets comprises: a cylindrical bulb receiving portion for the respective bulbs; a flange protruding from an outer periphery of the bulb receiving portion; a sealing material one of whose side surfaces is in contact with the flange, and the other of whose side surfaces is in contact with a surface to be an outer surface of the frame; and a stopper flange for stopping the frame by rotating each of the bulb sockets inserted into the respective bulb attachment holes. Also, electrical connecting portions to be connected to an electrode of each of the bulb at one end of each of the electrical connecting portions are provided to the outer periphery of the bulb receiving portions.

With the above structure, the bulb sockets can be easily maintained in a good condition, while showing excellent waterproof ability and workability.

In accordance with a seventh aspect of the vehicle lamp unit of the present invention, the other end of each of the electrical connecting portions is integrally disposed along the stopper flange, so as to form a contact portion to be electrically connected to the other end of each of the electrical connecting portions formed in the vicinity of each of the bulb attachment holes on the surface to be the inner surface of the frame.

By employing such a connecting structure between the bulb sockets and the lighting conductor, the bulb sockets can be connected to the lighting conductor as they are engaged with the frame. Thus, the connecting between the bulb sockets and the lighting conductor can be made simpler.

In accordance with an eighth aspect of the vehicle lamp unit of the present invention, the other end of each of the electrical connecting portions is integrally disposed along the outer periphery of corresponding one of the bulb receiving portions, and a contact portion to be electrically connected to the other end of each of the electrical connecting portions is formed on a side surface of corresponding one of the bulb attachment holes.

With the connecting structure between the bulb sockets and the lighting conductor, the bulb sockets can be connected to the lighting conductor as they are engaged with the frame. Thus, the connecting of the bulb sockets and the lighting conductor can be made simpler. Also, excellent waterproofing can be expected, because the contact portion is not exposed on the surface to be the outer side of the frame.

In accordance with a ninth aspect of the vehicle lamp unit of the present invention, a cylindrical member is formed in the vicinity of each of the bulb attachment holes on a surface to be an outer surface of the frame.

By employing such a cylindrical member, the bulb sockets can be protected from water. Thus, excellent waterproofing can be expected, and high reliability can be obtained.

The above and other objects and features of the present invention will become more apparent from the following description taken in conjunction with the accompanying drawings.

DESCRIPTION OF THE PREFERED EMBODIMENTS

The following is a detailed description of one embodiment of the present invention, with reference to the accompanying drawings.

Figure 1:
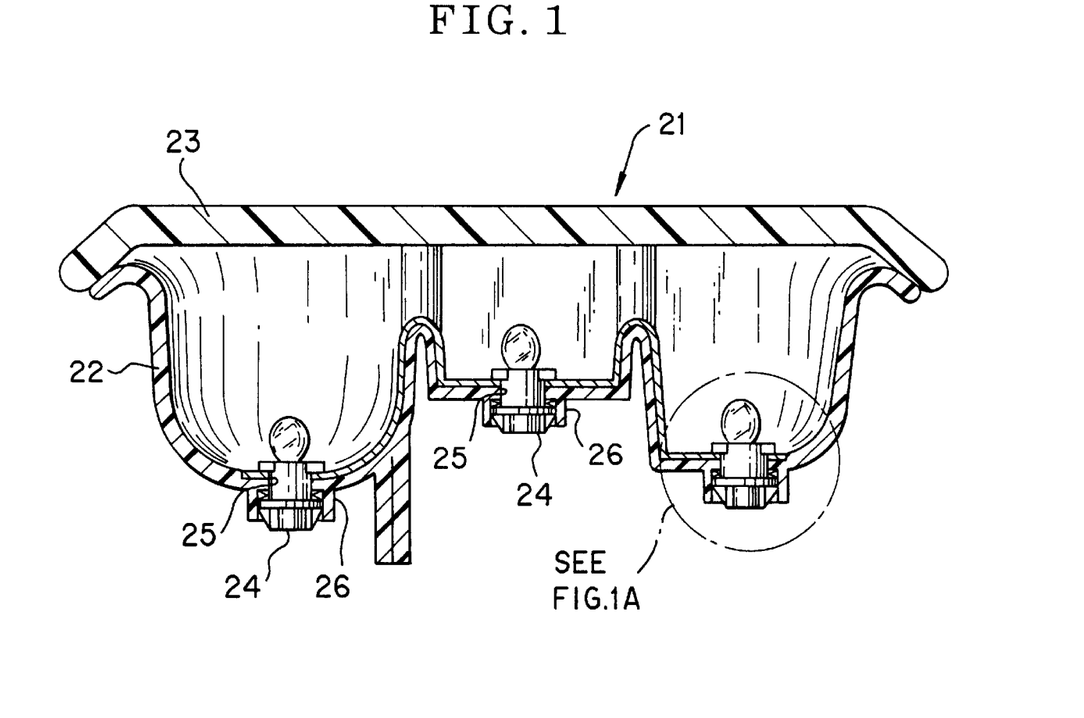
FIG. 1 is a sectional view of the vehicle lamp unit of a first embodiment of the present invention.
Figure 1A:
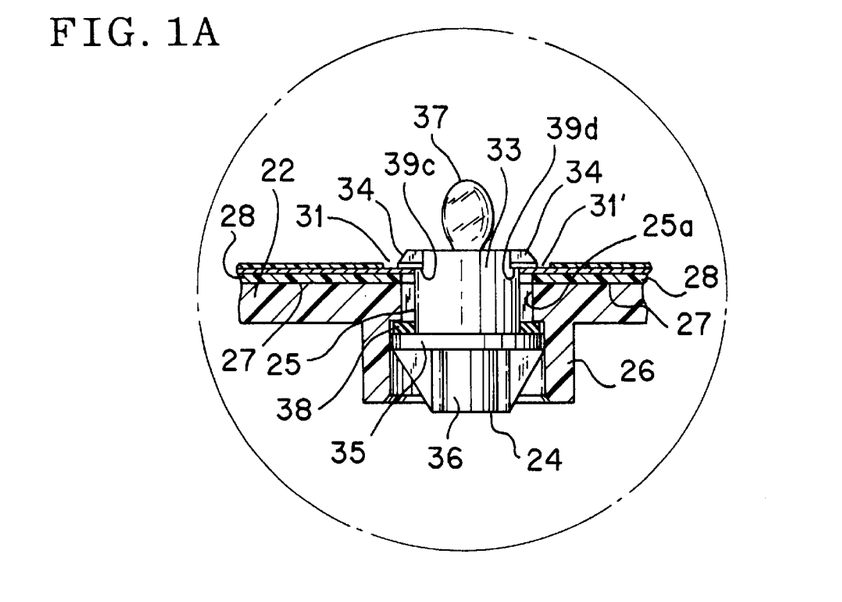
FIG. 1A is an enlarged view of a portion shown in FIG. 1.

In FIG. 1, reference numeral 21 indicates a rear combination lamp unit (hereinafter referred to as "lamp unit") of a vehicle. The lamp unit 21 comprises a frame 22, a lens 23 attached to the front surface of the frame 22, and a plurality of bulb sockets 24 attached to the rear surface of the frame 22. (Although three of them are shown in FIG. 1, the number is not limited to it.).

The frame 22 is integrally made of a synthetic resin material, and has three bulb attachment holes 25 for the three bulb sockets 24. Each of the bulb attachment holes 25 is provided with notches 25a (shown in FIGS. 2 and 4). In the vicinity of each bulb attachment hole 25, cylindrical members 26 protrude from the rear surface of the frame 22, i.e., the outer surface of the frame 22.

Figure 2:
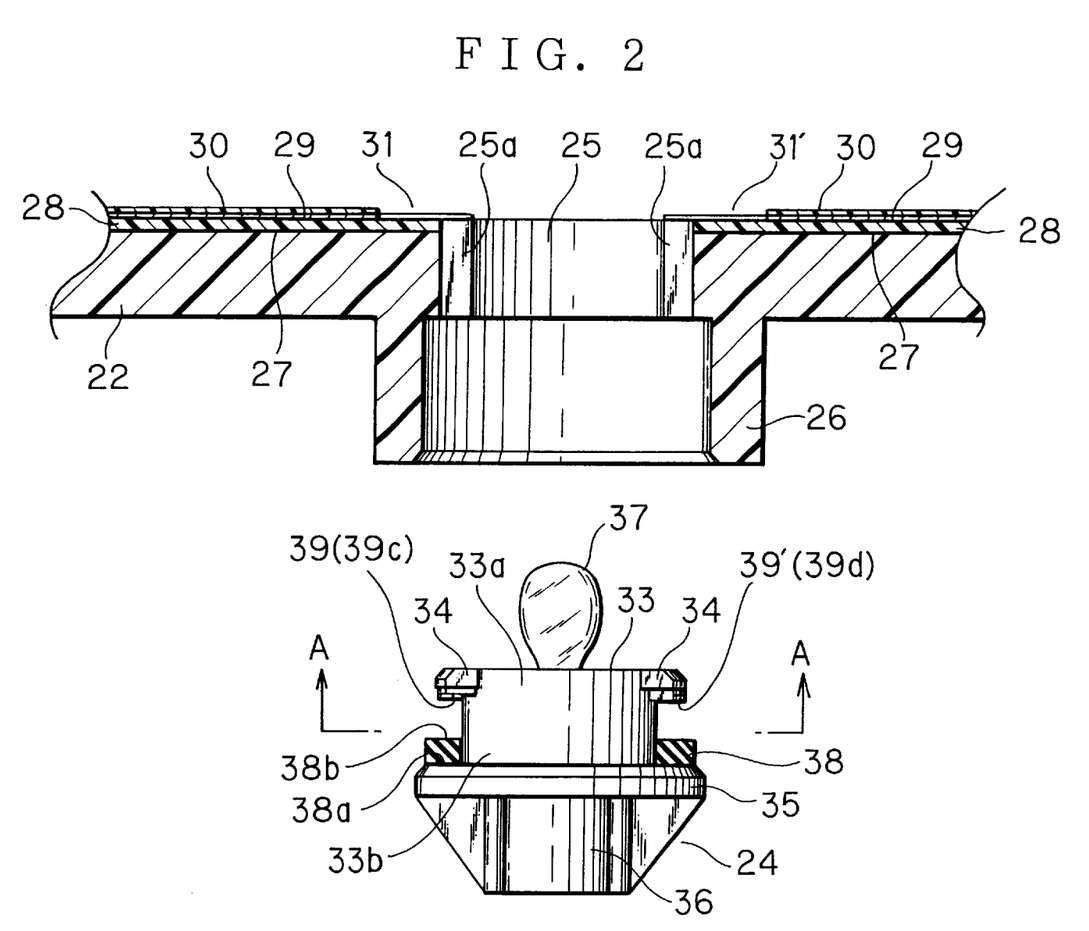
FIG. 2 is an enlarged sectional view of the neighboring area of a bulb attachment hole and a bulb socket of FIG. 1.

As shown in FIG. 2, a concave groove 27 is formed on the inner surface of the frame 22, and a belt-like flat arranging material 28 to be connected to the bulb sockets 24 is fixed to the concave groove 27 by known fixing means.

Figure 3:
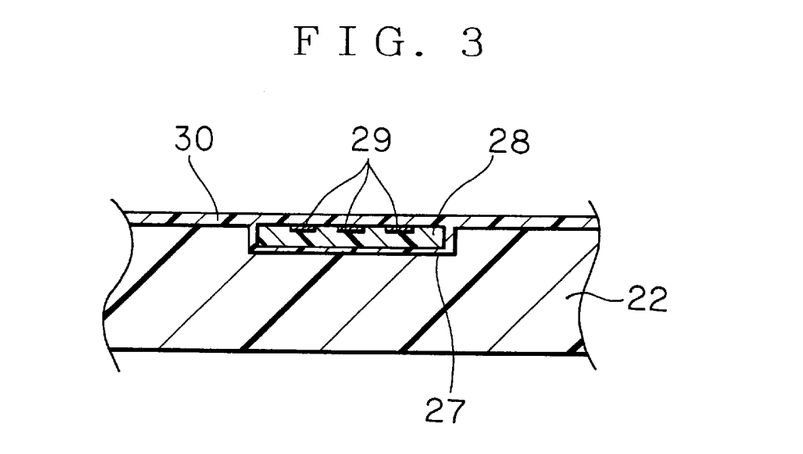
FIG. 3 is a sectional view of the frame of FIG. 1, with the flat arranging material being attached to it.

The concave groove 27 is formed by caving the frame 22 by the thickness of the flat arranging material 28, as shown in FIG. 3. One side surface of the flat arranging material 28 fixed to the concave groove 27, i.e., the surface on which conductors 29 (described below) are exposed, substantially corresponds to the inner surface of the frame 22.

The flat arranging material 28 is rectangular in section, and formed integrally with three conductors 29 by molding, as shown in FIG. 3. The conductors 29 have desired arranging patterns (not shown) for the bulb sockets 24, and have a shape corresponding to the shape of the frame 22.

A reflection surface 30 is formed on the inner surface of the frame 22, provided with the flat arranging material 28 fixed into the concave groove 27, including the surface of the flat arranging material an the surface on which the conductors 29 of the flat arranging material 28 are exposed. The reflection surface 30 is formed by uniformly applying a coating material to the inner surface, and the coating material reflects light toward the lens 23 when a bulb 37 is switched on.

Figure 4:
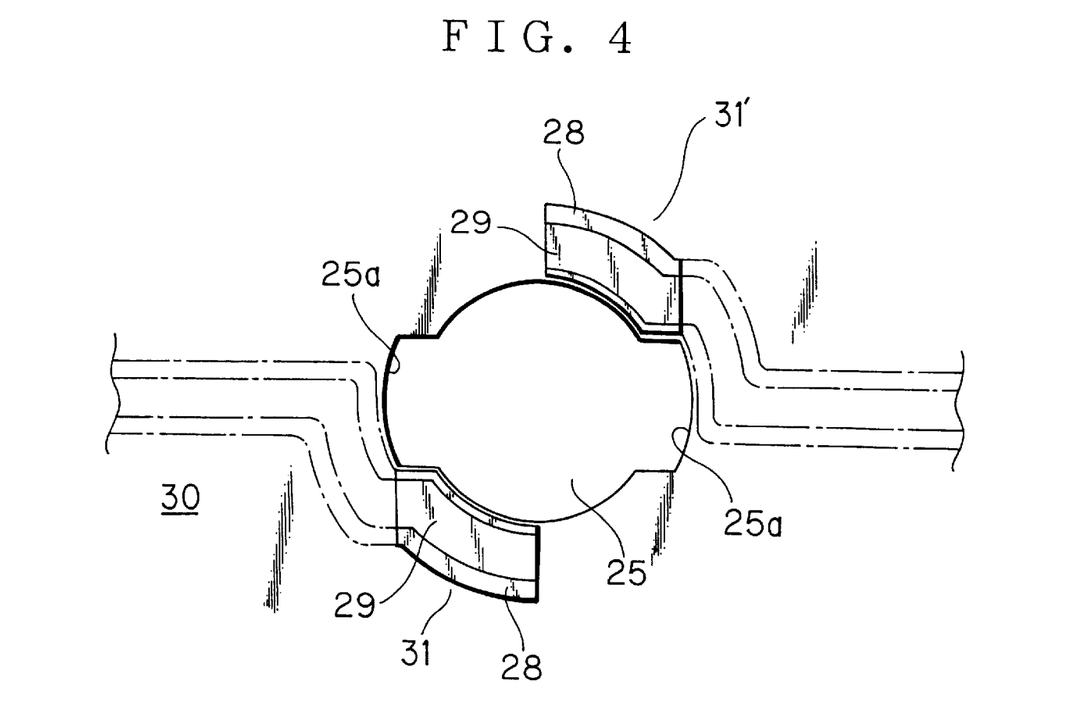
FIG. 4 is a plan view of the contact portions formed in the vicinity of a bulb attachment hole.

As shown in FIG. 4, the coating material forming the reflection surface 30 is substantially applied to the entire surface except the flat arranging material 28 in the vicinity of the bulb attachment holes 25. The areas, where the reflection surface 30 is not formed and the conductors 29 are exposed, serve as contact portions 31 and 31' to be electrically connected to electrical connecting portions 39 and 39' (described later).

The flat arranging material 28 can be a known circuit such as a flexible print circuit or a flexible flat circuit.

Referring back to FIG. 2, each of the bulb sockets 24 comprises a bulb receiving portion 33, stopper flanges 34 provided to a first end portion 33a of the bulb receiving portion 33, a flange 35 provided to a second end portion 33b of the bulb receiving portion 33, and an attachment portion 36 integrally formed with the flange 35. As the bulb 37 is attached at the side of the first end portion 33a of the bulb receiving portion 33, a sealing member 38 is attached to the outer periphery of the bulb receiving portion 33.

Figure 5:
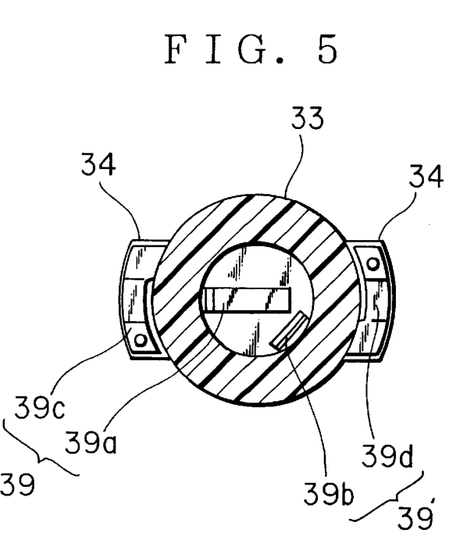
FIG. 5 is a sectional view of the bulb socket taken along the line A—A of FIG. 2.

As shown in FIG. 5, the bulb receiving portion 33 is cylindrically formed, and first end portions 39a and 39b of the electrical connecting portions 39 and 39' to be connected to two electrodes (not shown) of the bulb 37 are formed in the bulb receiving portion 33.

Second end portions 39c and 39d of the electrical connecting portions 39 and 39' protrude along the stopper flanges 34 provided to the outer periphery of the bulb receiving portion 33, and are integrally formed with the stopper flanges 34. Although the electrical connecting portions 39 and 39' are molded in this embodiment, the method of forming them is not limited to it.

Referring back to FIG. 2, the flange 35 protrudes from the surface of the outer periphery of the bulb receiving portion 33, and so that one surface 38a of the sealing member 38 is brought into contact with the flange 35.

When the bulb socket 24 is attached to the frame 22, the other surface 38b of the sealing member 38 is in contact with and pressed by the outer surface of the frame 22 so as to serve as waterproof for the frame 22 and the bulb sockets 24.

The attachment portion 36 is formed in such a shape shown in FIG. 2 that an operator can pinch it to rotate when attaching or detaching the bulb sockets 24 to the frame 22.

Since the lens 23 (shown in FIG. 1) has a conventional structure, it will not be described below.

The process of attaching each of the bulb sockets 24 to the corresponding bulb attachment hole 25 of the frame 22 will be described below, with reference to FIG. 2.

First, the attachment portion 36 of each of the bulb sockets 24 is pinched and adjusted to a predetermined position, so that the stopper flanges 34 of the bulb socket 24 can be inserted into the notches 25a of the corresponding bulb attachment hole 25.

The bulb socket 24 is then inserted into the bulb attachment hole 25 via the corresponding cylindrical member 26, and the stopper flanges 34 pass through the notches 25a. Here, the other surface 38b of the sealing member 38 is brought into contact with and pressed by the surface outside the frame 22.

After the stopper flanges 34 pass through the notches 25a, the bulb socket 24 is rotated by 45 degrees via the attachment portion 36, so that the electrical connecting portions 39 and 39' can slide along the contact portions 31 and 31' of the flat arranging material 28. By doing so, the electrical connecting and attaching of the bulb sockets 24 can be complete.

In the lamp unit 21 of the above structure, a joint portion (not shown) of the flat arranging material 28 is formed for the three bulb sockets 24 inside the frame 22, i.e., on the reflection surface 30. The joint portion can be surely protected from entrance of water.

By arranging the flat arranging material 28 in the frame 22, there will be no hindrance to smooth operations on the outer surface of the frame 22. Thus, the process of exchanging bulbs can be made very easy, and workability in maintenance can be dramatically improved.

Also, since the flat arranging material 28, to which the coating material for the reflection surface is applied, is arranged in the frame 22, workability in arrangement becomes high, and the lamp unit 21 functions without deterioration.

Next, a second embodiment of the vehicle lamp unit of the present invention will be described below, with reference to FIGS. 6 and 7. It should be noted here that like components are denoted by like reference numerals in this embodiment and the first embodiment.

Figure 6:
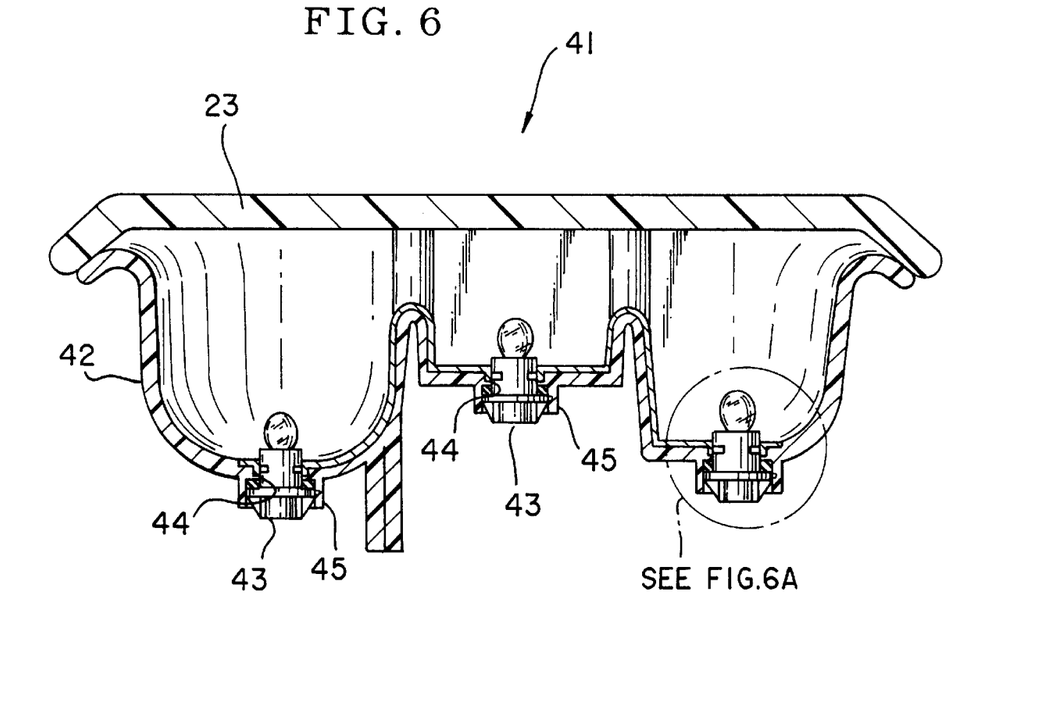
FIG. 6 is a sectional view of a vehicle lamp unit of a second embodiment of the present invention.
Figure 6A:
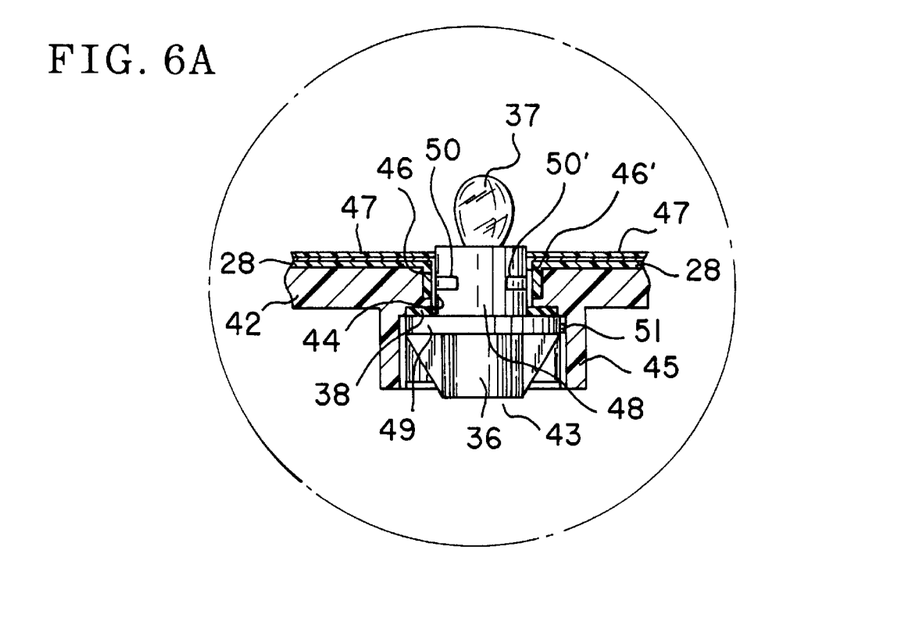
FIG. 6A is an enlarged view of a portion shown in FIG. 6.

In FIG. 6, a lamp unit 41 comprises a frame 42, a lens 23 to be attached to the front surface of the frame 42, and a plurality of bulb sockets 43 to be attached on the side of the rear surface of the frame 42. Although three bulb sockets are shown in FIG. 6, the number of bulb sockets is not fixed at 3.

The frame 42 is integrally formed from a synthetic resin material, and like the frame 22 in the first embodiment, three bulb attachment holes 44 are formed for accommodating the three bulb sockets 43. In the vicinity of each of the bulb attachment holes 44, a cylindrical member 45 protrudes from the rear surface of the frame 42, i.e., from the outer surface of the frame 42.

Figure 7:
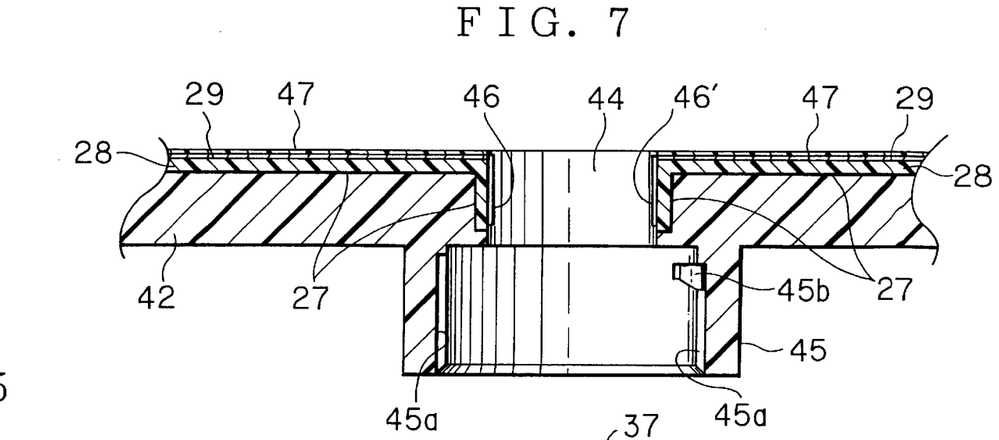
FIG. 7 is an enlarged sectional view of a bulb attachment hole and a bulb socket of FIG. 6.

In FIG. 7, each of the cylindrical members 45 is provided with notches 45a for stopper protrusions 51 and 51' of the corresponding bulb socket 43, and with a pair of stopper grooves 45b (only one of them is shown in the figure) communicating with the notches 45a.

A concave groove 27 are formed on the inner surface of the frame 42, and a belt-like flat arranging material 28 for the bulb sockets 43 is attached to the concave groove 27.

In this embodiment, the flat arranging material 28 is arranged with the concave groove 27 formed even on the side surface of each of the bulb attachment holes 44, and the portions of the flat arranging material 28 arranged on the side surface of each of the bulb attachment holes 44 serve as contact portions 46 and 46' to be electrically in contact with electrical connecting portions 50 and 50' of the corresponding bulb socket 43.

Meanwhile, a reflection surface 47 is formed on the inner surface of the frame 42 with the flat arranging material 28 adhering to the concave groove 27. The reflection surface 47 is formed by uniformly applying a coating material for a reflection surface to the entire inner surface of the frame 42, except the contact portions 46 and 46'.

Each of the bulb sockets 43 comprises a bulb receiving portion 48, a flange 49 communicating with the bulb receiving portion 48, and an attachment potion 36 integrally formed with the flange 49. As a bulb 37 is attached to one end 48a of the bulb receiving portion 48, a sealing material 38 is attached onto the outer periphery of the bulb receiving portion 48.

Each bulb receiving portion 48 is cylindrically formed, and electrical connecting portions 50 and 50' for the contact portions 46 and 46' are integrally formed along the outer periphery of each bulb receiving portion 48. In each bulb receiving portion 48, first end portions of the electrical connecting portions 50 and 50' to be connected to two electrodes (not shown) of the bulb 37 penetrate through the outer periphery, and formed in the same manner as in the first end portions 39a and 39b of the electrical connecting portions 39 and 39' of the first embodiment.

The flange 49 protrudes from the surface of the outer periphery of each of the bulb receiving portions 48, so that the first surface 38a of the sealing material 38 is brought into contact with it. Also, a pair of stopper protrusions 51 to be engaged with stopper grooves 45b (only one of them is shown in the figure) of the corresponding cylindrical member 45 are formed on the outer periphery of the flange 49.

Referring now to FIG. 7, the process of attaching each of the bulb sockets 43 to the corresponding bulb attachment hole 44 of the frame 22 will be described below.

First, the attachment portion 36 of each of the bulb sockets 43 is pinched and adjusted to a predetermined position, so that the stopper protrusions 51 of the bulb socket 43 can be inserted into the notches 45a of the cylindrical member 45.

When the bulb socket 43 is inserted into the corresponding bulb attachment hole 44, the stopper protrusions 51 are guided by the notches 45a, and the bulb socket 43 is further pushed into the corresponding bulb attachment hole 44. Thus, the second surface 38b of the sealing material 38 is brought into contact with and pressed by the outer surface of the frame 42.

The bulb socket 43 is then rotated by 45 degrees via the attachment portion 36, so that the stopper protrusions 51 are inserted into the stopper grooves 45b (only one of them is shown in the figure), and that the electrical connecting portions 50 and 50' can slide along the contact portions 46 and 46' on the side surface of the bulb attachment hole 44.

By doing so, the electrical connection and attachment of the bulb sockets 43 can be complete.

As described so far, the lamp unit 41 of the above structure can attain the same effects as the lamp unit 21 of the first embodiment, and eliminate the problems of the prior art.

Figure 8:
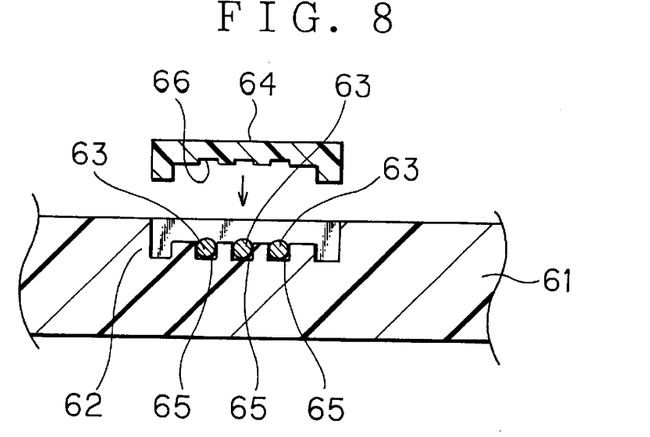
FIG. 8 is a sectional view of another example of the arrangement of FIG. 3.
Figure 9:
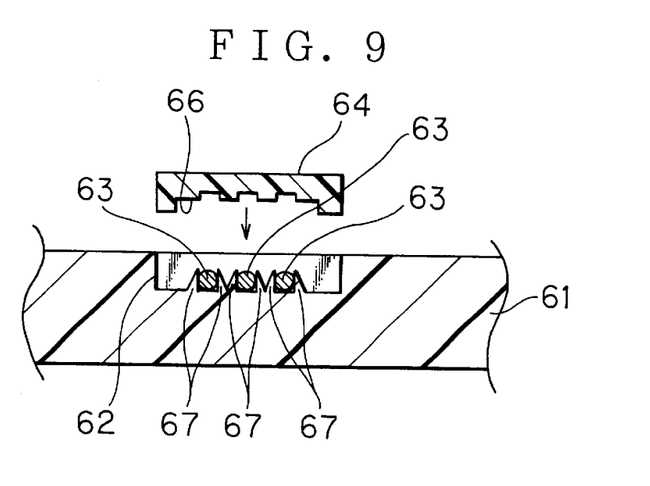
FIG. 9 is a sectional view of a modified form of the example of FIG. 8.
Figure 10:
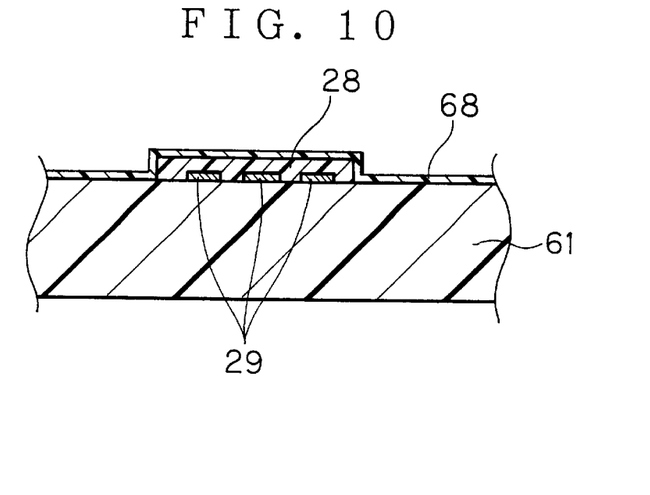
FIG. 10 is a sectional view of yet another example of the arrangement of FIG. 3.

The following is a description of another example of arrangement of conductors for lighting on the inner surface of the frame, with reference to FIGS. 8 to 10.

In the example shown in FIG. 8, a concave groove 62 is formed in a predetermined position on the inner surface of a frame 61. Three wires 63 are arranged in the concave groove 62, and then covered with a cover 64.

In the concave groove 62, wire fixing grooves 65 for fixing the wires 63 are formed. The cover 64 is provided with escape portions 66 for the wires 63 arranged and fixed to the fixing grooves 65.

With the wires 63 being fixed to the concave groove 62 and the cover 64 being placed over it, the same coating material for reflection surfaces as in the above embodiments is applied to the opposite surface to the escape portions 66 of the cover 64 and the inner surface of the frame 61. Thus, a reflection surface (not shown) is uniformly formed.

In the example shown in FIG. 9, the fixing grooves 65 of FIG. 8 are replaced with clips 67 protruding from the concave groove 62.

The wires 63 are arranged with the clips 67, and a reflection surface (not shown) may be formed uniformly on the opposite surface to the escape portions 66 of the cover 64 and on the inner surface of the frame 61.

The wires 63 may be enameled wires or metal wires, for instance. The fixing grooves 65 and the clips 67 serve to maintain stability at the time of arranging.

In the example shown in FIG. 10, the flat arranging material 28 is stuck to a predetermined position on the inner surface of the frame 61.

In this case, the flat arranging surface is stuck onto the surface, on which the conductors are exposed. A coating material for reflection surfaces is then applied onto the inner surface so as to form the inner surface of the frame 61 and the reflection surface 68.

As described above, the examples of arrangements shown in FIGS. 8 to 10 have no adverse influence on the functions of the lamp unit, and thus can be effective arranging methods.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A vehicle lamp unit, comprising:

a plurality of bulb sockets each provided with a bulb;

a frame having bulb attachment holes for accommodating the plurality of bulb sockets, the frame having a concave groove;

a first reflection surface formed on an inner surface of the frame;

a lighting conductor connected to the bulbs via the bulb sockets and communicating with electrical conductors of a vehicle, the lighting conductor comprising a belt-shaped flat arranging material, at least one side of the flat arranging material having a second reflection surface and the lighting conductor being accommodated in the concave groove.

2. The vehicle lamp unit according to claim 1, wherein the flat arranging material is arranged by caving the inner surface of the frame.

3. A vehicle lamp unit, comprising:

a plurality of bulb sockets each provided with a bulb;

a frame having bulb attachment holes for accommodating the plurality of bulb sockets;

a reflection surface formed on a surface of the frame; and a lighting conductor connected to the bulbs via the bulb sockets and communicating with electrical conductors of a vehicle, the lighting conductor being buried under the reflection surface, wherein the frame having a concave groove for accommodating the lighting conductor and a cover for enclosing the concave groove, wherein the lighting conductor is made of wires which are one of enameled and metal wires, the concave groove accommodates the wires and is formed by caving the surface of the frame, the cover for the concave groove is attached to the reflection surface formed on the frame, and the reflection surface formed on the frame is on at least one side of the cover.

4. The vehicle lamp unit according to claim 3, wherein one of clips and fixing grooves is formed in the concave groove.

5. The vehicle lamp unit according to any one of claims 1 or 2 to 4, wherein each of the bulb sockets comprises:

a cylindrical bulb receiving portion for the bulb;

a flange protruding from an outer periphery of the bulb receiving portion;

a sealing material one of whose side surfaces is in contact with the flange, and the other of whose side surfaces is in contact with a surface to be an outer surface of the frame;

a stopper flange for fixing each of the bulb sockets to the frame by rotating each of the bulb sockets inserted into each of the bulb attachment holes; and electrical connecting portions to be connected to electrodes of each of the bulbs at one end of each of the electrical connecting portions are provided to the outer periphery of the bulb receiving portions.

6. The vehicle lamp unit according to claim 5, wherein one end of each of the electrical connecting portions is integrally disposed along the stopper flange, so as to form a contact portion to be electrically connected to a contact portion formed in the vicinity of each of the bulb attachment holes of the frame.

7. The vehicle lamp unit according to claim 6, wherein a cylindrical member is formed on a surface to be an outer surface of the frame and in the vicinity of each of the bulb attachment holes.

8. The vehicle lamp unit according to claim 5, wherein one end of each of the electrical connecting portions is integrally disposed along the outer periphery of corresponding one of the bulb receiving portions, and a contact portion to be electrically connected to the end of each of the electrical connecting portions is formed on a side surface of corresponding one of the bulb attachment holes.

9. The vehicle lamp unit according to claim 8, wherein a cylindrical member is formed on a surface to be an outer surface of the frame and in the vicinity of each of the bulb attachment holes.

10. The vehicle lamp unit according to claim 5, wherein a cylindrical member is formed on a surface to be an outer surface of the frame and in the vicinity of each of the bulb attachment holes.

11. The vehicle lamp unit according to any one of claim 1 or 2 to 4, wherein a cylindrical member is formed on a surface to be an outer surface of the frame and in the vicinity of each of the bulb attachment holes.

12. A vehicle lamp unit, comprising:
a plurality of bulb sockets each provided with a bulb;
a frame having bulb attachment holes for accommodating the plurality of bulb sockets;
a lighting conductor connected to the bulbs via the bulb sockets and communicating with electrical conductors of a vehicle, the lighting conductor being disposed on a surface of the frame; and
a first reflection surface formed on the surface of the frame; and
a second reflection surface coated on the lighting conductor.

* * * * *